United States Patent
Mirbaha et al.

(10) Patent No.: US 10,511,940 B2
(45) Date of Patent: Dec. 17, 2019

(54) MEASURING AND ANALYZING THE MOVEMENT OF MOBILE DEVICES WITH THE HELP OF A WIRELESS TELECOMMUNICATION NETWORK

(71) Applicant: Motionlogic GmbH, Berlin (DE)

(72) Inventors: Vahid Mirbaha, Berlin (DE); Steffen Lipperts, Berlin (DE)

(73) Assignee: Motionlogic GmbH, Berlin (DE)

( * ) Notice: Subject to any disclaimer, the term of this patent is extended or adjusted under 35 U.S.C. 154(b) by 0 days.

(21) Appl. No.: 16/416,026

(22) Filed: May 17, 2019

(65) Prior Publication Data
US 2019/0357013 A1    Nov. 21, 2019

(30) Foreign Application Priority Data

May 17, 2018 (EP) .................................. 18173042

(51) Int. Cl.
*H04W 4/029* (2018.01)
*G06F 16/182* (2019.01)
*G06F 16/13* (2019.01)
*H04W 12/02* (2009.01)

(52) U.S. Cl.
CPC ............ *H04W 4/029* (2018.02); *G06F 16/13* (2019.01); *G06F 16/182* (2019.01); *H04W 12/02* (2013.01)

(58) Field of Classification Search
CPC ..... H04W 4/029; H04W 12/02; G06F 16/182; G06F 16/13
See application file for complete search history.

(56) References Cited

U.S. PATENT DOCUMENTS

| | | | |
|---|---|---|---|
| 2007/0171046 A1* | 7/2007 | Diem | G06Q 10/00 340/539.13 |
| 2012/0115475 A1* | 5/2012 | Miyake | G06Q 10/06 455/435.1 |
| 2015/0005007 A1 | 1/2015 | Schewel et al. | |
| 2016/0196494 A1 | 7/2016 | Scarr et al. | |
| 2017/0041762 A1 | 2/2017 | Colonna et al. | |

* cited by examiner

*Primary Examiner* — Dinh Nguyen
(74) *Attorney, Agent, or Firm* — Steven M. Shape; Dennemeyer & Associates, LLC

(57) ABSTRACT

The aim of the disclosed method is to measure and analyze the movement of mobile devices utilizing their communication with a telecommunication network. This includes receiving telecommunication control data associated with the mobile devices, which comprise at least a timestamp, a unique identifier of the mobile device and information on the location of the device. The corresponding data is organized in data objects, which group all data sets associated with a single mobile device identifier. The data objects are extended by additional attributes, which can be derived using algorithms that parse the data objects. The objects are thus extended in a way that all information stored in the data objects, i.e. the raw telecommunication control data and the attributes, is available for all subsequent analysis.

12 Claims, 2 Drawing Sheets

MEASURING AND ANALYZING THE MOVEMENT OF MOBILE DEVICES WITH THE HELP OF A WIRELESS TELECOMMUNICATION NETWORK

FIELD OF THE INVENTION

The present invention relates to a method for measuring and analyzing the movement of mobile devices with the help of a wireless telecommunication network.

BACKGROUND OF THE INVENTION

Telecommunication data represent a branch of what is commonly referred to as big data. They are generated, for example, by the everyday use of mobile phones and collected by operators of telecommunication networks. In particular telecommunication control data include information about the mobile phone and its user, where the user is typically identified by means of the International Mobile Subscriber Identity (IMSI). This information is stored at the Subscriber Identity Module (SIM), typically a small card (SIM card), which needs to be integrated in a mobile device for correct use. By this, telecommunication control data can be used to track SIM cards. As typically a mobile device is carried by a person, tracking SIM cards enables, indirectly, the tracking of the movements and activities of persons. Besides persons, it is also possible to track other mobile devices, for example in the context of the next generation industrial automation.

In its raw state, the telecommunication control data are organized in terms of single telecommunication events. The corresponding data sets include information on the time of the event, the location of the antenna involved and the identifier that was transmitted by the mobile device. This information is used, at first, for operating the network and carrying out telecommunication services. However, it can also be used for other secondary purposes such as, for example, to monitor actions of single users, devices or a crowd thereof and, thus, to monitor traffic, material or work flows. To this end, it is beneficial and, in many cases, also necessary to condition the raw telecommunication control data. This is typically done in several steps.

A first step can be to enrich the raw telecommunication control data by additional demographic, device and network attributes. These attributes can be obtained, for example, from the information that is provided by a user in a respective service contract. Such an enrichment of the raw data represents an auxiliary step. It is often performed because it allows for more useful queries and analyses, while, at the same time, the cost is relatively low.

The next step is critical for many purposes. It deals with the problem that personalized information on the telecommunication activities of single users can reach very far into their privacy. Accordingly, the use of telecommunication data, in particular for secondary purposes, are often severely restricted by regulations for data protection. A typical measure to achieve the necessary compliance with data protection regulations is to scramble the data in a way that it cannot be traced back to a single person. The corresponding processes are often carried out in close accord with a third, independent party such as, for example, the federal commissioner for data protection and freedom of information or an independent technical inspection authority. After such scrambling, the scope of application that is in compliance with data protection regulations has become much broader, in particular the data may now be stored on much longer terms and also used by third parties.

Typically, it is also advantageous to presort the data in order to speed up typical queries. An example is to sort the telecommunication events with respect to single devices and arrange them in chronological order. Thus, movement or telecommunication profiles can be obtained. Such presorting is beneficial if the focus of the subsequent analysis is on tracking and analyzing the movement of a single device or a crowd of devices. Other forms to organize the data are also possible. If the focus is, for example, on the operation and stability of the network, it is better to presort the events with respect to single antennas rather than single devices. This already shows that the processing of the data and the resulting data structures depends on the nature and characteristics of the subsequent analyses and queries.

After conditioning the data, more involved crowd analyses can be performed. To this end, algorithms need to be developed that search and characterize the data points in addition to the raw characteristics that are provided by the user or the operator of the telecommunication network. These algorithms establish causal links between the events and can be used to organize the data points in larger structures. Such parsing can be based on both deterministic and probabilistic methods, where the statistics of the latter is often significant due to the mere number of devices and telecommunication events. Parsing is used to reduce the complexity of the data. It reveals or highlights correlations and, thus, facilitates a condensed view on the problem posed by the purpose of the crowd analyses.

As an example, different telecommunication events can be linked in a straightforward way by analyzing the locations of the involved antennas. Events associated with the same antenna indicate that the device was not leaving the area or sector of a single antenna for a certain time (speed of movement equals 0 m/s), while different locations indicate that the device was moving. A more involved analysis is necessary if one is interested in the means of transportation that has been chosen, for example a car, a ship or a train. Thus, for example, the commuter traffic to and from a city can be analyzed.

The results of such crowd analyses are used to draw general conclusions from the behavior of an otherwise incomprehensibly complex system such as a large crowd of individuals or devices. It can also be used for technological applications such as, for example, to control or plan public transportation systems or to facilitate new forms of mobility such as car sharing or i-mobility, where it is necessary to predict the demand, availability, service intervals and other functional parameters.

The disadvantage of the analyses that have been employed so far is that the underlying technological problem often requires to design new algorithms, parsing rules and search strategies and, subsequently, repeated and involved scans of the whole data set. Knowledge obtained in previous searches or queries is not used, because the data structures are not backwards compatible. Similarly, the data obtained by one algorithm are incompatible with the one obtained by another algorithm. As a consequence, the present procedures do not allow for new or subsequent queries or search tactics which may emerge, for example, in the course of a manual or automated analysis, real-time monitoring or controlling, or in future campaigns.

OBJECT OF THE INVENTION

It is, therefore, an object of the present invention to provide a method for measuring and analyzing the movement of mobile devices with the help of a wireless telecommunication network with higher flexibility.

BRIEF SUMMARY OF THE INVENTION

This object is achieved by the invention as claimed in the independent claim. Advantageous embodiments are described in the dependent claims. The use of the singular form should not exclude a possible multiplicity and vice versa, except for cases where it is explicitly stated.

In what follows, individual steps of the method will be described in detail. The steps do not necessarily have to be performed in the order given in the text. Also, further steps not explicitly stated may be part of the method.

The aim of the disclosed method is to measure and analyze the movement of mobile devices utilizing their communication with a telecommunication network. This represents a low cost effort, when the infrastructure of the network exists and the corresponding data are already collected for the purpose of carrying out telecommunication services.

The use of telecommunication networks allows for a monitoring of mobile devices that is up-to-the-minute and, in many cases, also bridges physical borders such as, for example, walls.

The communication typically occurs in terms of single events, where the mobile devices exchange data with an antenna of the network. Besides the content of the communication, these data sets include administrative information on the event, at least a timestamp, a unique identifier of the mobile device and information on how to reach the device within the network. In many cases, the latter includes information about the physical location of the device.

These telecommunication control data, which are associated with the mobile devices, are received. Subsequently, a plurality of data sets of the received telecommunication control data is organized in at least one data object, wherein each data object comprises data sets with an identical mobile device identifier.

In a further step, the data objects are stored for further analysis. In a further step, the data objects are extended by at least one attribute, wherein the attribute is derived from the data objects by an algorithm able to characterize the movement of the mobile devices.

Finally, the at least one attribute is stored within the data object for further analysis.

At this point, the data objects contain the raw telecommunication control data and all attributes that have been derived so far. Further analyses may still be necessary for a number of reasons. For example, it may be desirable to extend the analysis by additional attributes, because hints for a new behavior emerged. Typically, this requires further corroboration and new analytical steps. It is also possible that the purpose of the analysis has changed. Since the data objects are only extended and no information has been lost, it is now possible to run another analytical step.

If there is additional raw data, for example by an update of the telecommunication control data during a monitoring of a crowd in real-time, it is also possible to repeat all steps of the method. Thus, different analyses can be combined because the attributes are stored in the same data objects. Moreover, knowledge obtained in previous searches or queries can be used.

The method can be extended or specialized in many ways. A crowd analysis of persons, for example, often requires to comply with data protection regulations. To this end, the telecommunication control data can be anonymized before retrieving them from the operator of the network. The data are anonymized if data identifying the owner of a mobile device have been removed.

The data sets associated with a telecommunication event include three basic elements: a timestamp; a mobile device identifier; and information on how to reach the device within the telecommunication network. The latter can be, for example, a set of attributes that identifies the antenna involved in the event, i.e. its cell ID and location area code. It may also be obtained by using triangulation, where the signal strengths that are measured by at least two, typically three, antennas in the vicinity of the mobile device are evaluated. It is also possible or even desirable that the device itself reveals its position, transmitting a signal from the global positioning system (GPS) or a reference signal received from base stations or other mobile devices. This increases the spatial resolution of the crowd analysis significantly.

The number of data packets exchanged between mobile devices and the telecommunication network can be very large, e.g. billions of packets per day in a restricted area. Therefore, it is desirable to restrict the received telecommunication control data to a subset which is relevant for the measurement and analysis of the movement of mobile devices. To this end, a list of desired types of telecommunication control data (signal types) is defined and only telecommunication control data of the defined types are received.

Examples for the desired signal types could include:
Mobile Originated Call: Signal associated with incoming calls;
Mobile Terminated Call: Signal associated with outgoing calls;
SMS incoming: Signal associated with incoming short-text messages;
SMS outgoing: Signal associated with outgoing short-text messages;
PLU: Signal associated with the cell a mobile device is registered while in idle mode;
Technology change: Signal associated with a change of telecommunication technology used by the mobile device such as, for example, a change from 2G to 4G.
New cell ID/local area code: Signal associated with the new cell after a mobile device has changed the cell.

The definition of the list of the signal types can be done either by the telecommunication network operator or by the side receiving the telecommunication control data. Equally, the selection of the telecommunication control data to be received can be done either by the telecommunication network operator or by the side receiving the telecommunication control data.

On the other hand, an attribute, which is derived from the data objects by an algorithm able to characterize the movement of the mobile devices, is typically associated with a subset of the data sets in a data object. Examples for attributes which are typically associated with a group of events include trips (moves) or activities (non-moves). This can include the analysis of traffic flows. This may also include information on the number of occurrences or the preferred order of the moves. When combining movement patterns with other information, for example train or bus routes, attributes can be derived such as the means of transportation. Furthermore, such attributes can characterize an action or activity of a person carrying the mobile device, e.g. the visit of a specific event. This, however, is only a selection of all possible attributes that can be used to characterize the behavior of a mobile device or, possibly, its user.

The data objects can be extended by at least one additional attribute, which is associated with all data sets in a data object.

This additional attribute can be demographic information about the person carrying the mobile device or information on the service contract of the user with the operator of the telecommunication network. It may also represent information on the device characteristics such as, for example, if it is a smart phone, a smart watch or an autonomous car. The information may also be obtained by analyzing the movement pattern of the mobile device. This includes, for example, attributes that characterize a user of a mobile device as a commuter or other information that can be gained by operating the network and carrying out telecommunication services. Such attributes can be stored more efficiently than attributes that are associated with a subset or single events.

All attributes are stored in the data objects and are available for further analyses. This includes the possibility to derive new attributes from other attributes and, therefore, to increase the complexity of the analyses step by step.

The data sets organized in one data object belong to a single mobile device identifier. This presorting is beneficial for crowd analysis. An even more advantageous presorting can be achieved if the telecommunication events are arranged in chronological order.

In some cases, crowd analyses can be performed only using algorithms that are numerically very complex. In other cases, the amount of data represents a numerically challenging problem. One strategy to solve this problem in a reasonable amount of time is to use powerful computing systems. Such systems, however, are often not available. An alternative is to use distributed computing systems, where a number of small computing systems are linked together such that they effectively represent a much larger or powerful computing system. The small clusters may be even located at different places, buildings, cities, states or countries. This requires to use a database model where the data objects are stored using a distributed file system such that all clusters of the computing network can access the data objects on demand.

For similar reasons, it is advantageous to use database models that avoid locking procedures, i.e. procedures that block the access to the data objects or parts of it, if another part of the computing system is already accessing it. Here, a shared-nothing architecture can be used.

Once the crowd analysis has been performed, it needs to be visualized. This requires fast access to the corresponding results, suggesting to use a document-oriented database model.

Other database models and combinations thereof may also be useful in the present context. In particular, column-based database models can exploit the chronological order of the telecommunication events and, thus, speed-up the analyses.

In a preferred embodiment, a cluster of nodes hosts the entire solution. File storage and processing load is shared so the system can run in a distributed manner. The application code is designed in a modular fashion, i.e. each module is a standalone functionality with its own configuration, scripts, and dependencies. The code modules support distributed processing. The data is stored in distributed and redundant long term storage facilities to enable data replication and parallel access. The system also stores auxiliary data like graphs, geospatial information as serialized and structured plain or binary format for the purpose of fast access and quick search.

The method described so far can be encoded in a computer program. The program can be stored in a storage medium or loaded onto a file server where it can be accessed from a network. The storage medium can be plugged in a computing system, which loads the computer program into a main or working memory. The program may also be retrieved by the computing system from a file server or loaded onto the computing system by a user. Once the program is loaded in the main or working memory, the computing system can start to execute the instructions therein and perform the proposed method.

The latter requires a computing system with an operating system that allows for the execution of the instructions encoded in the computer program.

The computing system or network of computing systems should comprise at least one device with an operating system to execute the instructions in the computer program that performs the proposed method.

BRIEF DESCRIPTION OF THE SEVERAL VIEWS OF THE DRAWINGS

Other objects and advantages of the present invention may be ascertained from a reading of the specification and appended claims in conjunction with the drawings therein. For a more complete understanding of the present invention, reference is established to the following description of example work flows and data objects made in connection with accompanying drawings. The possibilities to solve the problem are not limited to the given examples. The example work flows and data objects are shown schematically in the figures. The same reference numerals in the individual figures designate the same or functionally identical or with respect to their functions corresponding elements. In detail the figures show:

DETAILED DESCRIPTION OF THE INVENTION

Figure 1:
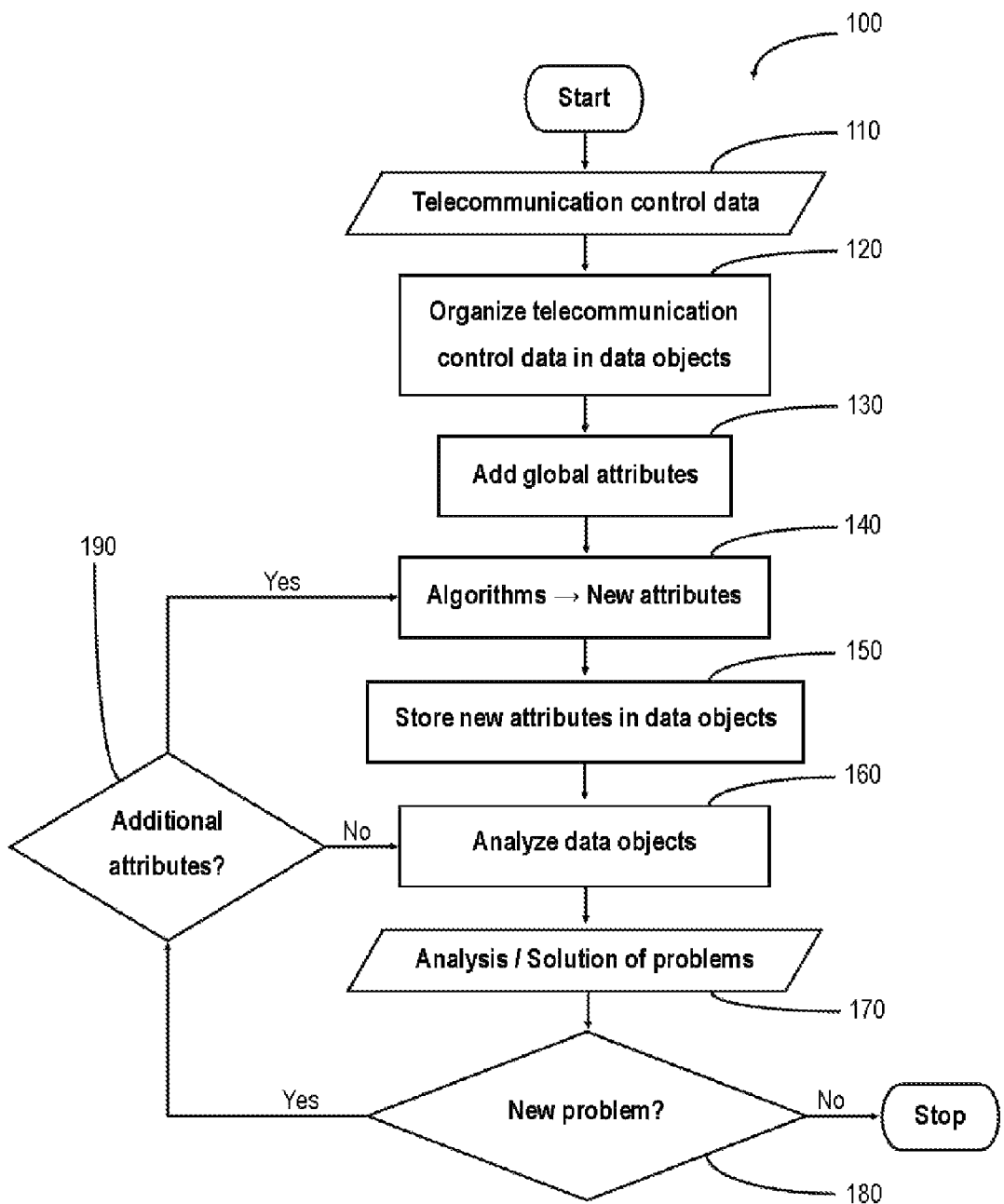
FIG. 1 an example of a work flow for crowd analysis according to the proposed method.

FIG. 1 is a schematic overview on how crowd analysis can be performed according to the proposed method 100. The figure shows a work flow for crowd analysis that is used, for example, to analyze the commuter traffic to a city.

The basic input for the analysis is raw telecommunication control data. In this example, the data have already been anonymized by the operator before sending it. It is retrieved in step 110 by downloading it from a file server.

The anonymized data includes data sets that contain information on telecommunication events, including, at least, a time stamp, a mobile device identifier and information on the location of the device. In step 120, the data sets are presorted according to the mobile device identifiers and organized in data objects such that each object contains only data sets with the same mobile device identifier. In addition, the data sets are arranged chronologically such that the data objects include the movement profiles of the single devices. The data objects created in step 120 are the basis for all subsequent analyses.

At this point, the data objects are enriched in step 130 by attributes, which characterize the mobile devices or their users. These attributes are provided, for example, by the operator of the telecommunication network. This can include the age or sex of a user. In the analysis step 140, algorithms are applied to the data objects. They are designed to derive attributes, which can be used, for example, to characterize the telecommunication events of a data object. Basic examples are trips or activities, where the mobile device was communicating with different or the same antenna for a given time, respectively. More involved examples includes activities of (day) tourists, activities by direction of movement, trips characterized by the means of transportation that is used, attributes derived by an origin-to-destination analysis or a catchment analysis, where, for example, the preferred area for staying overnight can be determined. These attributes are obtained by parsing the data objects and, thus, by the raw telecommunication control data and all other attributes that are stored in the object. Thus, the algorithms can use all previously obtained attributes and, in many cases, parse the data objects more efficiently. The new set of attributes that is derived in the previous step is now added to the data objects in step 150, including their relation to the single telecommunication events. The data objects are thus enlarged, while, using an efficient database model, the actual size of the data objects increases typically by only 20% to 30%. The latter reflects the fact that most attributes are associated with a large number of events rather than single ones.

At this point, the information stored in the data objects needs to be analyzed further. This analysis can include a simple count of mobile devices or users that passed a certain area in a certain time (footfall), moved into or out of a certain area or stayed in some area for a given time. The analysis may be even more detailed and split footfalls into footfall by direction of movement, footfall by overnight ZIP (postal code). Combinations are also possible, counting, for example, the number of passengers using a certain railway route or transiting a specific station. The data objects and the result of the analysis is the output retrieved in step 170. It may also constitute the solution of a problem related to, for example, the commuter traffic to the city.

At this point, the work flow can be stopped. However, it can also be continued if a new problem occurs or a new analysis is required. The corresponding decision is taken in step 180.

In a subsequent query 190, it is determined whether the new problem or analysis can be solved or carried out without deriving additional attributes, respectively. This is the case, for example, if the footfall needs to be determined at a place that was previously not considered. The work flow can thus be continued with step 160. If it is required to add a new class of attributes, corresponding algorithms need to be designed and applied to the data objects in step 140. This loop can be repeated as long as new problems emerge or new analyses are required, also at a later point, provided that the data objects can still be accessed.

Figure 2:
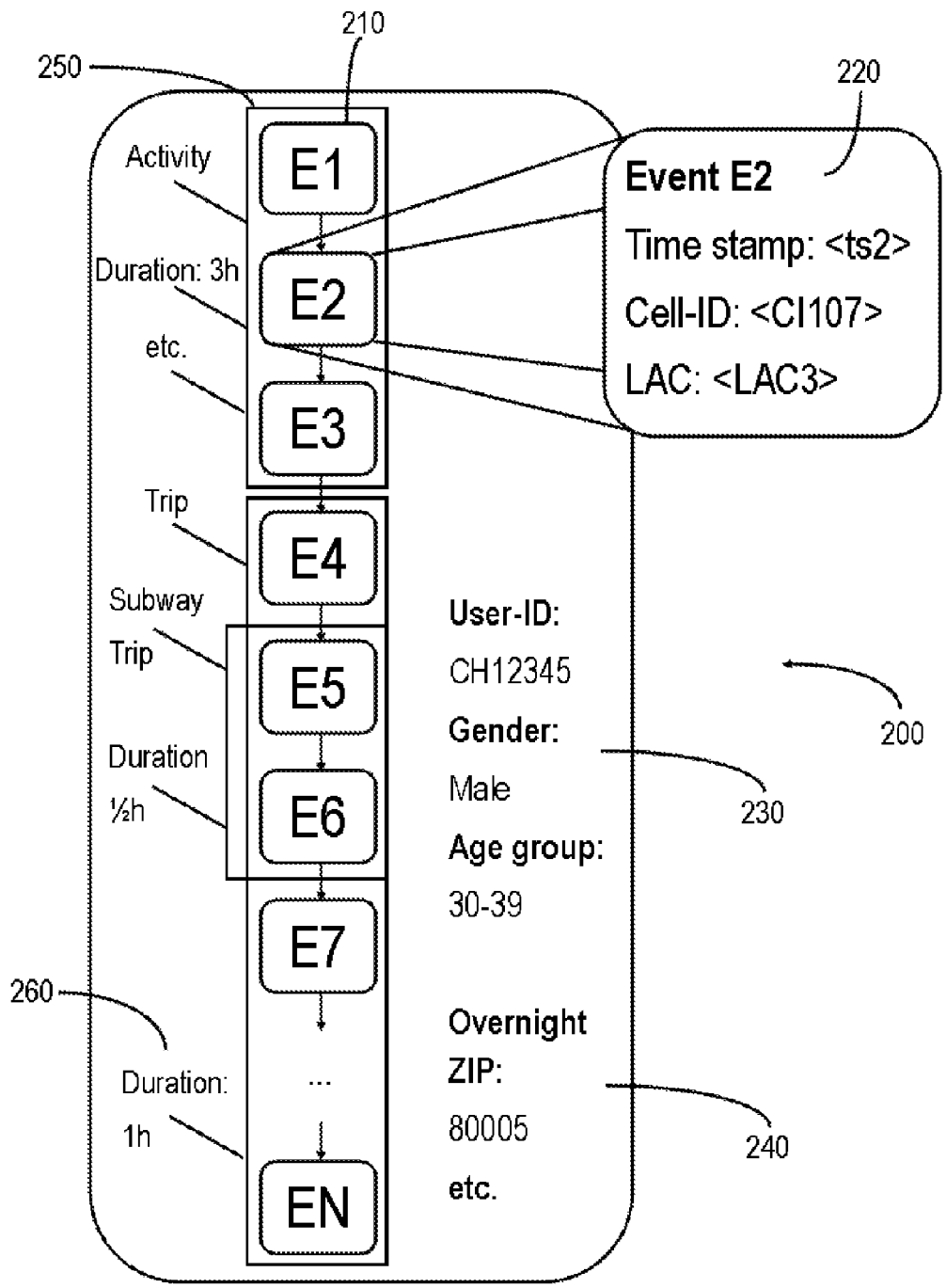
FIG. 2 a data object used for crowd analysis according to the proposed method.

FIG. 2 depicts the structure of a data object 200 that can be established by the proposed method 100. It contains data sets 210 corresponding to telecommunication events that are labelled E1, E2, . . . , EN. Each data set includes attributes that represent information on a telecommunication event. The basic attributes are, at least, a mobile device identifier, a time stamp, and information on the location of the mobile device. The latter two are included in the attribute block 220. Since the mobile device identifier is the same for all data sets in the data object, it is reasonable to store it only once. To this end, the data object includes a special attribute block 230 where such global attributes can be stored, that is attributes that characterize all data sets E1, E2, . . . , EN. In this example, the telecommunication events are arranged in chronological order. The order is indicated by arrows connecting subsequent events.

Besides the attribute block 230 and the data sets 210 with the attribute blocks 220, the data object also includes another set of attributes. This includes a set of global attributes 240 that are obtained by parsing the data objects with algorithms. An example is the overnight ZIP (postal code), which characterizes the user of a mobile phone. Other attributes characterize specific telecommunication events or a group thereof. The relation of the attribute to the telecommunication events is included via the links 250. Each linker object 250 involves an attribute block 260, characterizing the linked events. An example is a trip that spans the events E4 to EN. The respective attribute block contains information on why the events are linked together, for example because the mobile device or, to be more precise, its user was on a trip. Additional information can also be stored such as, for example, the duration of the trip or any other information that characterizes the linked group of events. Thus, the data objects 200 include both the raw telecommunication control data and all attributes that are either included in the raw data or obtained by using algorithms that parse the data objects.

While the present inventions have been described and illustrated in conjunction with a number of specific embodiments, those skilled in the art will appreciate that variations and modifications may be made without departing from the principles of the inventions as herein illustrated, as described and claimed. The present inventions may be embodied in other specific forms without departing from essential characteristics. The described embodiments are considered in all respects to be illustrative and not restrictive. The scope of the inventions are, therefore, indicated by the appended claims, rather than by the foregoing description. All changes which come within the meaning and range of equivalence of the claims are to be embraced within their scope.

Glossary

Algorithm

An algorithm represents an unambiguous set of instructions that are used, for example, in computer science for parsing data objects.

Attribute

In the context of computer science, an attribute is a specification that describes the property of an object. Typically, it consists of a name and a value.

Communication packet

A communication packet is a formatted set of data. It consists of both the content of the communication and administrative information required by the telecommunication network to deliver the content. The latter includes information on the participants of the communication and attributes that are necessary to operate the telecommunication network.

Crowd analysis

Crowd analysis refers to the interpretation of data sets that are gained by studying the natural movement of a group of objects, in many cases humans. Crowd or crowd tracking analyses include moves, movement patterns, changes and prediction thereof.

Data object

A data object includes a set of data elements and a unique identifier. Data objects offer in many cases enough flexibility to deal with big data.

Data set
A data set is a collection of data elements, which can be in an ordered or disordered state.

Event
An event in telecommunication is an event where a mobile device exchanges a communication packet with a telecommunication network.

IMSI
The International Mobile Subscriber Identity or IMSI is used to identify the user of a wireless telecommunication network and is a unique identification associated with all wireless telecommunication networks. It is typically stored as a 64 bit field and is sent by the phone to the network.

Shared-nothing architecture
A shared-nothing architecture is a way to organize processes on a distributed computing system, where each unit of the computing system is independent and self-sufficient, that is there is no data updating conflict.

Subscriber identity module
A subscriber identity module or subscriber identification module (SIM) is an integrated circuit that is intended to securely store the international mobile subscriber identity (IMSI) number and its related key, which are used to identify and authenticate subscribers on mobile telephony devices (such as mobile phones and computers). SIM cards can e.g. be used in phones, computers, or cameras.

Telecommunication control data
Telecommunication control data comprise all information that is obtained and used for operating a telecommunication network and carrying out telecommunication services.

REFERENCE NUMERALS

100 Work flow of a crowd analysis according to the proposed method
110 Input: Anonymized telecommunication control data from operator of telecommunication network
120 Aggregation of telecommunication control data in data objects
130 Enrichment of the data objects with additional attributes
140 Parsing of the data objects with algorithms to derive new attributes
150 Extension of the data objects with the attributes derived in the previous step
160 Analysis of the extended data objects
170 Output: Analysis or solution of a given problem
180 Query if a new problem should be analyzed
190 Query if the new problem requires a new set of attributes
200 Data object as obtained by the proposed method
210 Single telecommunication event
220 Data elements of a telecommunication event
230 Additional demographic and network attributes
240 Attributes derived by using an algorithm
250 Aggregation of events due to insights gained by an algorithm
260 Attribute of an aggregation of events 250

The invention claimed is:

1. Method for measuring and analyzing the movement of mobile devices with the help of a wireless telecommunication network comprising the following steps:
    a) receiving telecommunication control data associated with the mobile devices;
    b) wherein the telecommunication control data comprise data sets, each data set comprising:
        a timestamp of an event;
        an identifier for a mobile device involved in the event;
        information on a location of the mobile device at the timestamp of the event;
    c) wherein the event is an exchange of a communication packet between the mobile device and an antenna of the wireless telecommunication network;
    d) organizing a plurality of data sets of the telecommunication control data in at least one data object;
        wherein said at least one data object comprises data sets with an identical mobile device identifier;
    e) storing said at least one data object for further analysis;
    f) extending said at least one data object by at least one attribute, wherein the step of extending said at least one data object involves
        deriving the at least one attribute by an algorithm able to characterize the movement of the mobile device from both
            the data sets in said at least one data object and
            attributes that have been previously stored in said at least one data object;
        wherein the relationship between the derived at least one attribute and the data sets of said at least one data object are maintained; and
    g) storing the derived at least one attribute within said at least one data object, including its relationship to the data sets of said at least one data object for further analysis; and
    h) reiterating steps f to g when new algorithms are conceived to derive new attributes.

2. Method according to claim 1, characterized in that the telecommunication control data has been anonymized such that it complies with data protection regulations.

3. Method according to claim 1, characterized in that the information on the location of the mobile device
    includes a cell ID of the antenna involved in the event; and/or
    includes a location area code of the antenna involved in the event; and/or
    has been determined by means of triangulation using several antennas; and/or
    is a global positioning system (GPS) signal, transmitted by the device; and/or
    has been determined by means of inter-device communication.

4. Method according to claim 1, characterized
    in that a list of desired types of the telecommunication control data is defined; and
    in that only the telecommunication control data of the defined types are received.

5. Method according to claim 1, characterized in that the derived at least one attribute is associated with a subset of the data sets in said at least one data object.

6. Method according to claim 5, characterized in that the at least one attribute is chosen from a group consisting of:
    a move or non-move of a person carrying the mobile device;
    a movement pattern of a person carrying the mobile device;
    a means of transportation of a person carrying the mobile device;
    an action or activity of a person carrying the mobile device; and
    information characterizing the behavior of a person carrying the mobile device.

7. Method according to claim 1, characterized in that said at least one data object is extended by at least one additional attribute, which is associated with all data sets in said at least one data object.

8. Method according to claim 7, characterized in that the at least one additional attribute is chosen from a group consisting of:
- demographic data of subscribers of the wireless telecommunication network;
- information relevant for the operation of the wireless telecommunication network;
- properties of the mobile device; and
- characteristics of a person using the mobile device.

9. Method according to claim 1, characterized in that the data sets in said at least one data object are arranged in chronological order.

10. Method according to claim 1 characterized in that the data sets in said at least one data object are stored using distributed file systems.

11. A non-transitory storage medium, wherein computer-executable instructions are stored and wherein the computer-executable instructions are executed by a computing system comprising at least one device to perform the method according to claim 1.

12. A computing system comprising at least one device and memory executing computer-executable instructions to perform the method according to claim 1.

\* \* \* \* \*